US009698639B2

(12) United States Patent
Nonaka

(10) Patent No.: US 9,698,639 B2
(45) Date of Patent: Jul. 4, 2017

(54) ROTATING ELECTRICAL MACHINE AND METHOD FOR MANUFACTURING ROTATING ELECTRICAL MACHINE

(71) Applicant: KABUSHIKI KAISHA YASKAWA DENKI, Kitakyushu-shi (JP)

(72) Inventor: Tuyoshi Nonaka, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 223 days.

(21) Appl. No.: 14/561,714

(22) Filed: Dec. 5, 2014

(65) Prior Publication Data

US 2015/0084448 A1   Mar. 26, 2015

Related U.S. Application Data

(63) Continuation of application No. PCT/JP2012/083161, filed on Dec. 20, 2012.

(30) Foreign Application Priority Data

Jun. 8, 2012   (JP) .................................. 2012-131072

(51) Int. Cl.
*H02K 3/12*   (2006.01)
*H02K 3/30*   (2006.01)
(Continued)

(52) U.S. Cl.
CPC ................ *H02K 3/12* (2013.01); *H02K 1/16* (2013.01); *H02K 3/30* (2013.01); *H02K 3/44* (2013.01);
(Continued)

(58) Field of Classification Search
CPC .... H02K 15/02; H02K 15/0464; H02K 15/06; H02K 15/12; H02K 1/16; H02K 3/12; H02K 3/30; H02K 3/44; Y10T 29/49009
(Continued)

(56) References Cited

U.S. PATENT DOCUMENTS 3,254,150 A * 5/1966 Rogers, Jr. ............... H02K 3/30
                                                              174/121 R
4,113,791 A * 9/1978 Smith ................... C08G 59/685
                                                              336/96
(Continued)

FOREIGN PATENT DOCUMENTS

CN         1741349 A     3/2006
CN       101075756 A     11/2007
(Continued)

OTHER PUBLICATIONS

Translation of Foreign Patent JP 2011259566 A (Year: 2011).*
(Continued)

*Primary Examiner* — Alex W Mok
(74) *Attorney, Agent, or Firm* — Oblon, McClelland, Maier & Neustadt, L.L.P.

(57) ABSTRACT

A rotating electrical machine includes a rotor and a stator positioned circumferentially around the rotor. The stator includes multiple core elements arrayed in a circumferential direction of the rotor such that the core elements form multiple slots arrayed in the circumferential direction, and a unitary cylindrical coil resin structure including molded resin and lap wound air-core coils resin-molded in the molded resin, each of the air-core coils having an air-core, a first side portion and a second side portion extending on the opposite sides of the air-core such that the first side portion extends through a first one of the slots and the second side portion extends through a second one of the slots.

20 Claims, 12 Drawing Sheets

(51) Int. Cl.
*H02K 15/02* (2006.01)
*H02K 15/04* (2006.01)
*H02K 15/06* (2006.01)
*H02K 3/44* (2006.01)
*H02K 1/16* (2006.01)
*H02K 15/12* (2006.01)

(52) U.S. Cl.
CPC ......... *H02K 15/02* (2013.01); *H02K 15/0464* (2013.01); *H02K 15/06* (2013.01); *H02K 15/12* (2013.01); *Y10T 29/49009* (2015.01)

(58) Field of Classification Search
USPC .............................................. 310/43; 29/596
See application file for complete search history.

(56) References Cited

U.S. PATENT DOCUMENTS

| | | | | |
|---|---|---|---|---|
| 4,137,275 | A * | 1/1979 | Smith | C08G 59/226 525/482 |
| 4,224,541 | A * | 9/1980 | Smith | H01B 3/40 310/45 |
| 2004/0124733 | A1 | 7/2004 | Yamamoto et al. | |
| 2005/0146232 | A1 | 7/2005 | Yamamoto et al. | |
| 2006/0043816 | A1 | 3/2006 | Tanimoto et al. | |
| 2012/0242185 | A1* | 9/2012 | Tanimoto | A01D 34/78 310/208 |
| 2013/0106212 | A1* | 5/2013 | Nakazumi | H02K 9/22 310/65 |
| 2013/0300248 | A1* | 11/2013 | Ishida | H02K 3/345 310/214 |

FOREIGN PATENT DOCUMENTS

| | | |
|---|---|---|
| JP | 2003-304656 A | 10/2003 |
| JP | 2004-208386 A | 7/2004 |
| JP | 2007-135326 A | 5/2007 |
| JP | 2009-153287 A | 7/2009 |
| JP | 2009-278845 A | 11/2009 |
| JP | 2010-142075 A | 6/2010 |
| JP | 2011-259566 A | 12/2011 |

OTHER PUBLICATIONS

Combined Chinese Office Action and Search Report issued May 5, 2016 in Patent Application No. 201280073780.1 (with English Translation).

Office Action issued Jul. 6, 2015, in Japanese Patent Application No. 2014-519794 (with English-language Translation).

International Preliminary Report of Patentability and Written Opinion issued Dec. 18, 2014 in PCT/JP2012/083161 (English translation only).

International Search Report issued Feb. 5, 2013 in PCT/JP2012/083161 filed Dec. 20, 2012.

Kazumi Nagatomo, "Denji Actuator no Seizo Hoho", Japan Institute of Invention and Innovation, Journal of Technical Disclosure, Feb. 18, 2003 (Feb. 18, 2003), Journal of Technical Disclosure No. 2003-500808.

Chinese Office Action issued Dec. 29, 2017 in Patent Application No. 201280073780.1(with English Translation).

* cited by examiner

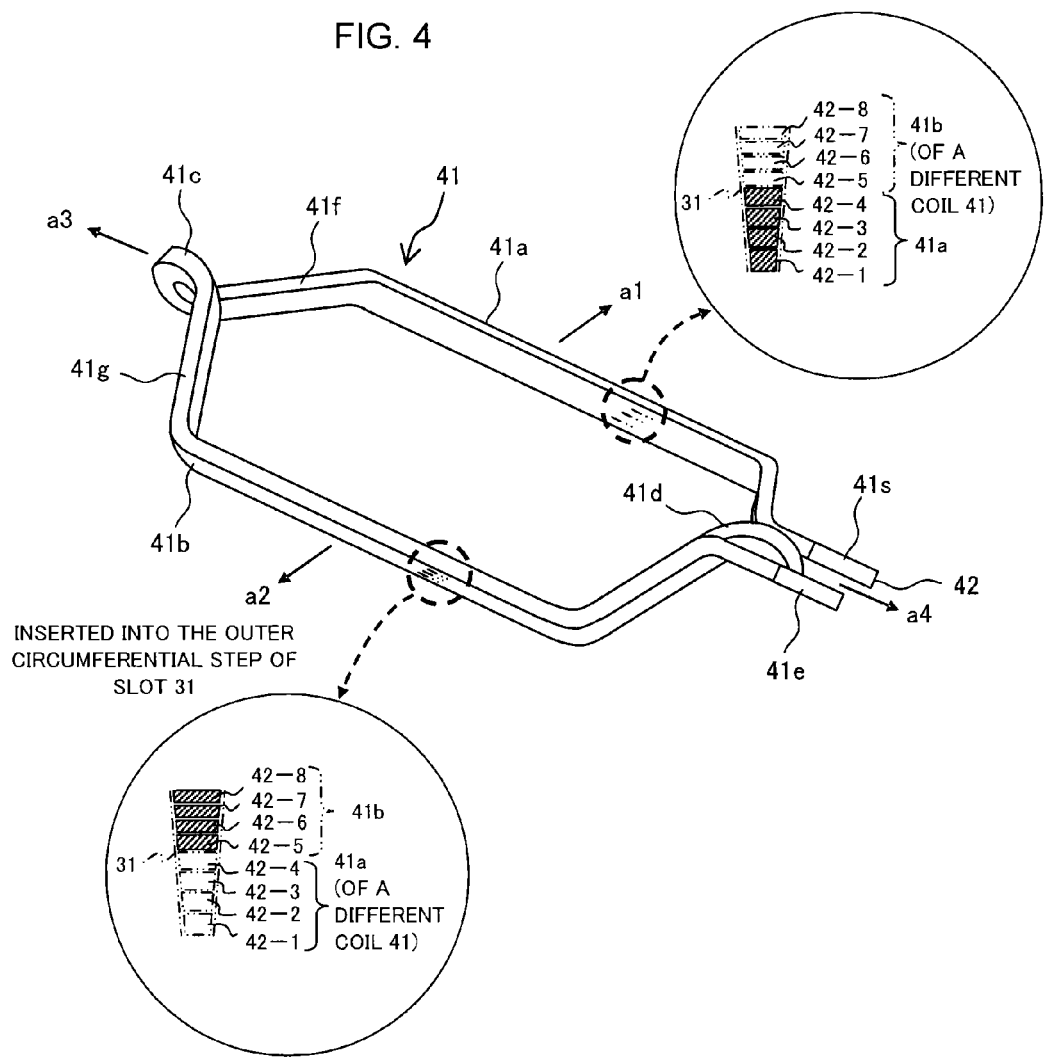
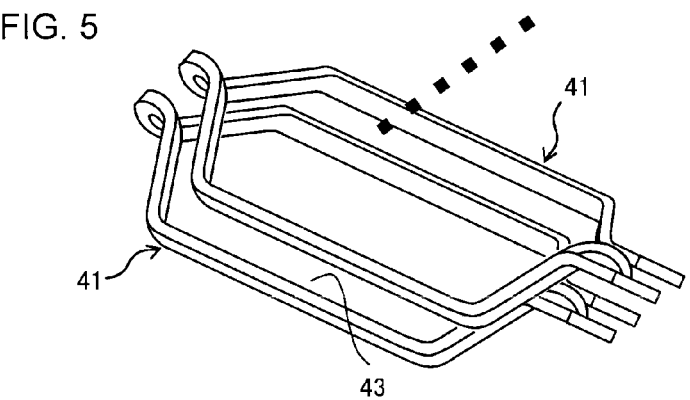

FIG. 11B
FIG. 11A
FIG. 11C
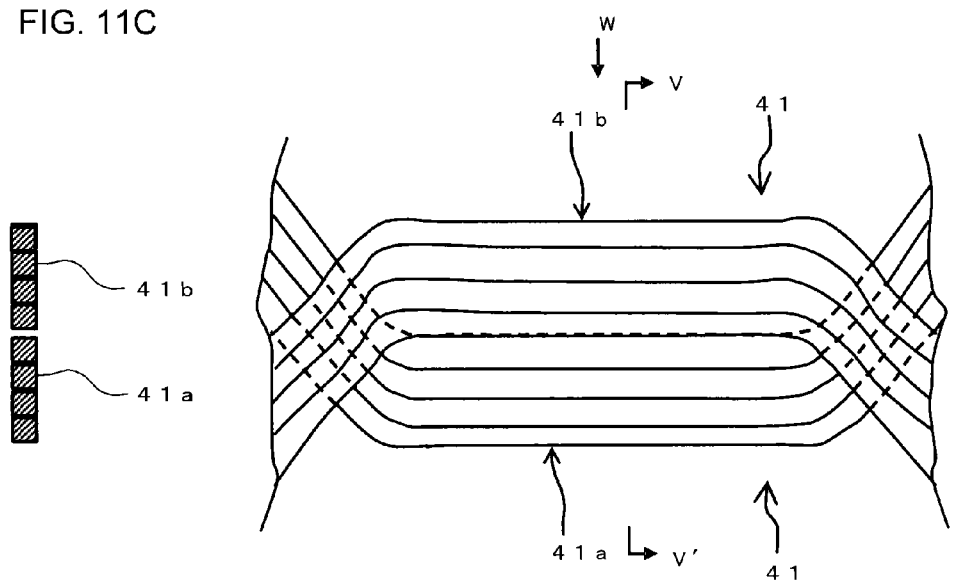

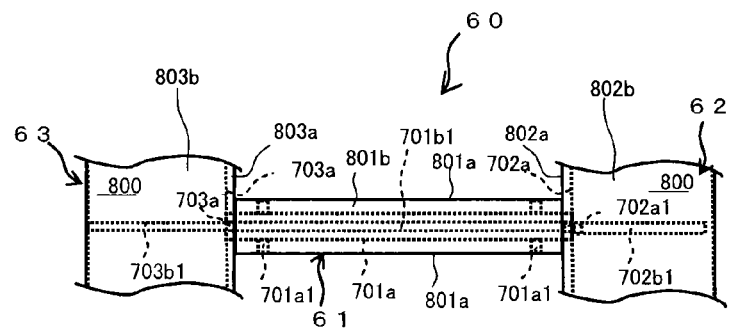
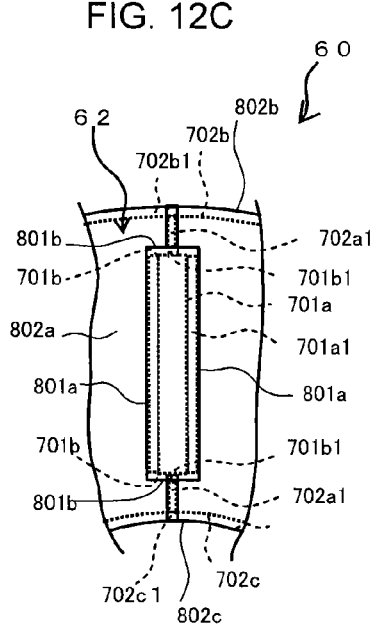
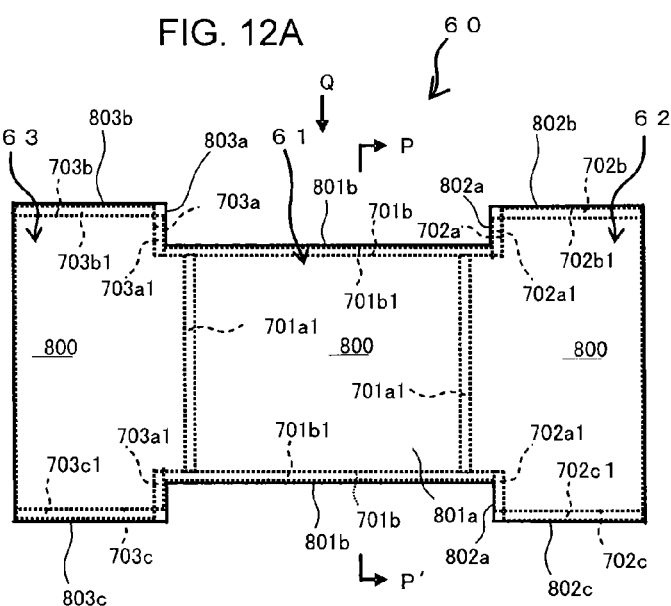
FIG. 12B
FIG. 12C
FIG. 12A

ROTATING ELECTRICAL MACHINE AND METHOD FOR MANUFACTURING ROTATING ELECTRICAL MACHINE

CROSS-REFERENCE TO RELATED APPLICATION

The present application is a continuation of and claims the benefit of priority to International Application No. PCT/JP2012/083161, filed Dec. 20, 2012, which is based upon and claims the benefit of priority to Japanese Application No. 2012-131072, filed Jun. 8, 2012. The entire contents of these applications are incorporated herein by reference.

BACKGROUND

Technical Field

The disclosed embodiment relates to a rotating electrical machine, and a method for manufacturing a rotating electrical machine.

Description of Background Art

A three-phase AC rotating electrical machine has a stator with a Y-connected winding serving as the winding of each phase of a distributed winding and a lap winding.

SUMMARY

According to one aspect of the present disclosure, a rotating electrical machine includes a rotor and a stator positioned circumferentially around the rotor. The stator includes multiple core elements arrayed in a circumferential direction of the rotor such that the core elements form multiple slots arrayed in the circumferential direction, and a unitary cylindrical coil resin structure including molded resin and lap wound air-core coils resin-molded in the molded resin, each of the air-core coils having an air-core, a first side portion and a second side portion extending on the opposite sides of the air-core such that the first side portion extends through a first one of the slots and the second side portion extends through a second one of the slots.

According to another aspect of the present disclosure, a unitary cylindrical coil resin structure for a rotating electrical machine includes molded resin, and lap wound air-core coils resin-molded in the molded resin, each of the air-core coils having an air-core, a first side portion and a second side portion extending on opposite sides of the air-core. When assembled with core elements of a stator of the rotating electrical machine, the core elements are arrayed in a circumferential direction of a rotor such that the core elements form slots arrayed in the circumferential direction, the first side portion of each of the air-core coils extends through a first one of the slots, and the second side portion of each of the air-core coils extends through a second one of the slots.

According to yet another aspect of the present disclosure, a method for manufacturing a rotating electrical machine includes lap-winding air-core coils such that lap wound air-core coils form a substantially cylindrical reel shape, resin-molding the lap wound air-core coils such that a unitary cylindrical coil resin structure including molded resin and the lap wound air-core coils resin-molded in the molded resin is formed, and assembling core elements of a stator to the unitary cylindrical coil resin structure such that the core elements are arrayed in a circumferential direction of a rotor and form slots arrayed in the circumferential direction, each of the air-core coils having an air-core, a first side portion and a second side portion extending on opposite sides of the air-core such that the first side portion extends through a first one of the slots and the second side portion extends through a second one of the slots.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is a conceptual view showing the outer appearance of the coil;

FIG. 5 is an explanatory view for explaining the lap-winding state of the coil;

FIG. 11A is an arrow view corresponding to FIG. 10A showing the details of the main parts with the coil assembled prior to forming the primary covering layer of the primary molding;

FIG. 11B is an arrow view from the arrow W direction in FIG. 11A;

FIG. 11C is a transverse cross-sectional view of the V-V' cross-section in FIG. 11A;

FIG. 12A is an arrow view from the arrow U direction in FIG. 8, showing the details of the main parts of the coil resin structure;

FIG. 12B is an arrow view from the arrow Q direction in FIG. 12A;

FIG. 12C is a transverse cross-sectional view of the P-P' cross-section in FIG. 12A.

DETAILED DESCRIPTION OF THE EMBODIMENTS

Figure 1:
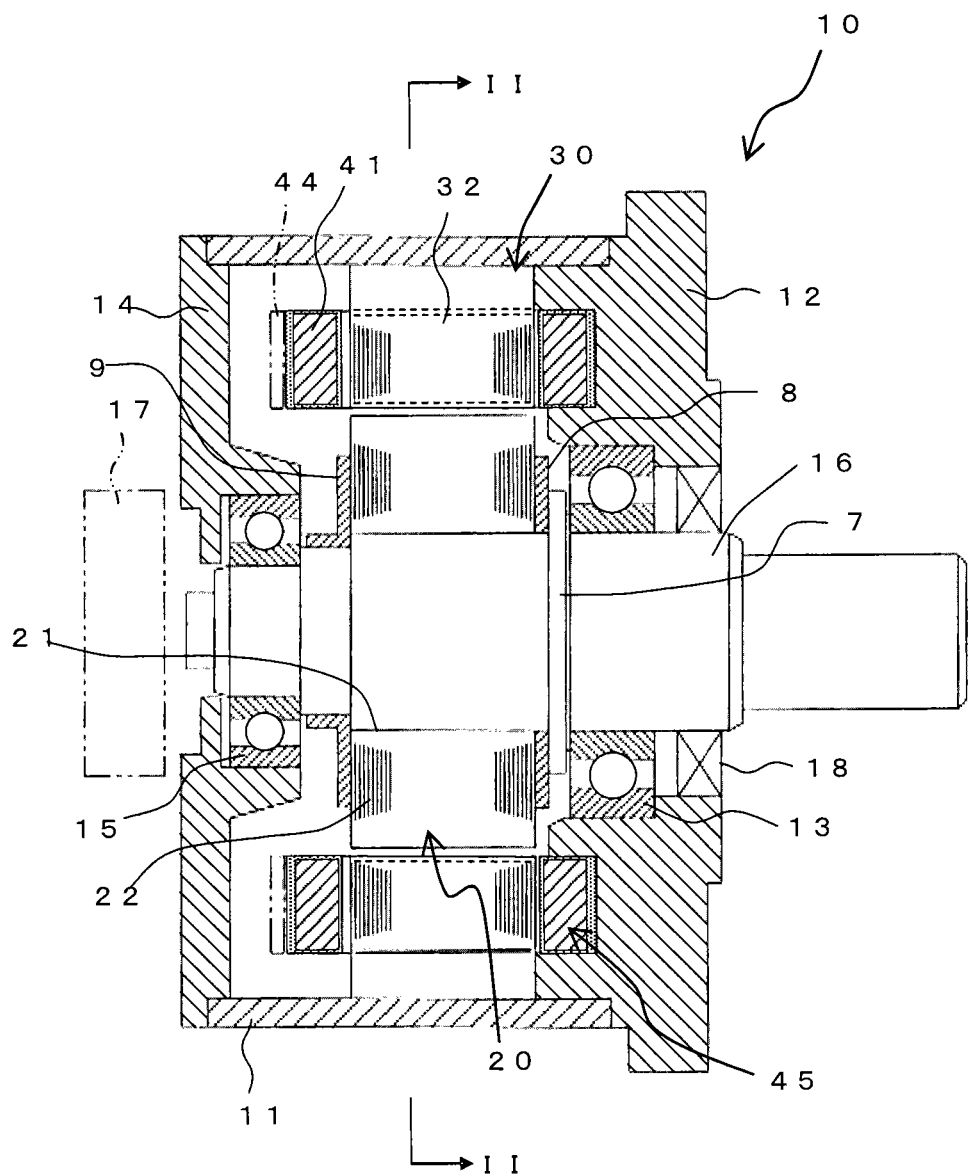
FIG. 1 is a longitudinal cross-sectional view showing the overall structure of a rotating electrical machine according to embodiment 1.

The embodiments will now be described with reference to the accompanying drawings, wherein like reference numerals designate corresponding or identical elements throughout the various drawings.

Embodiment 1

Rotating Electrical Machine

First, the structure of the rotating electrical machine in embodiment 1 will be described using FIG. 1 and FIG. 2.

Figure 2:
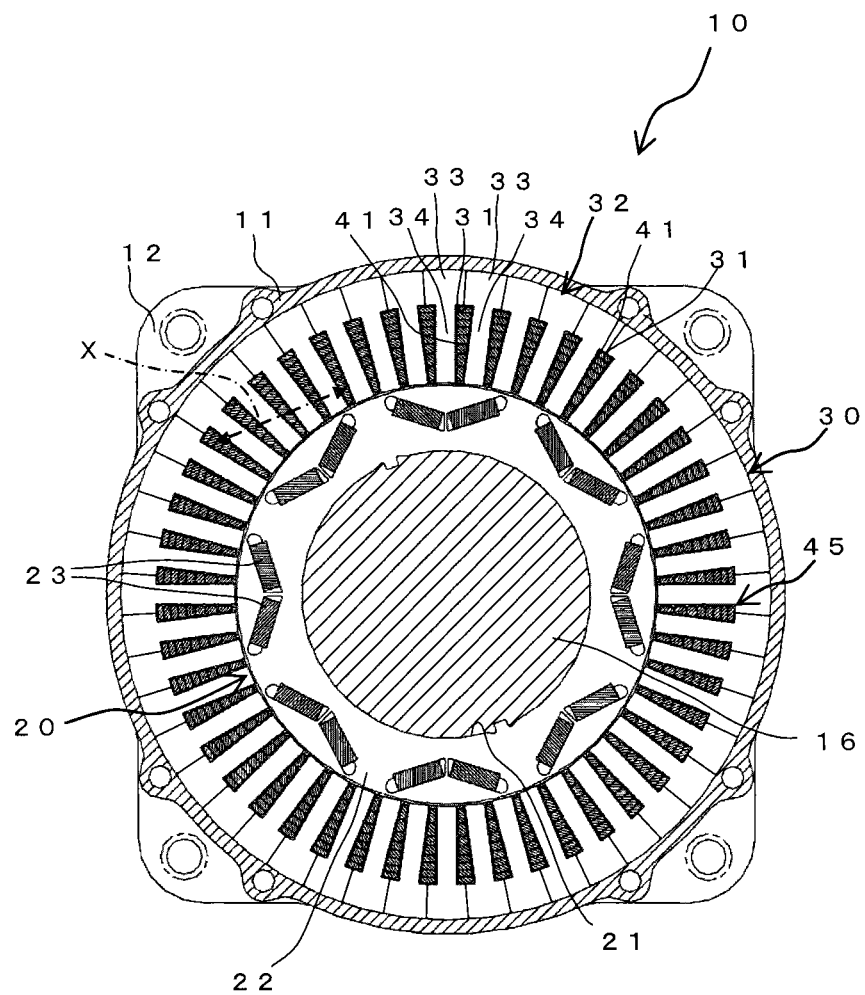
FIG. 2 is a transverse cross-sectional view of the II-II cross-section in FIG. 1.

As shown in FIG. 1 and FIG. 2, a rotating electrical machine 10 in this embodiment is a magnet-embedded synchronous motor having a rotor 20 inside a stator 30. That is, the rotating electrical machine 10 has the rotor 20 rotatably supported, and the substantially cylindrical stator 30 disposed so as to enclose a radial-direction outer circumference side of the rotor 20 with a magnetic air gap therebetween. Further, the rotating electrical machine 10 has a cylindrical frame 11 disposed on an outer circumference side of the stator 30, a load-side bracket 12 disposed on a load side (the right side in FIG. 1) of the frame 11, a load-side bearing 13 whereby an outer ring is fitted to the load-side bracket 12, a counter-load side bracket 14 disposed on a counter-load side (the left side in FIG. 1) of the frame 11, a counter-load side bearing 15 whereby an outer ring is fitted to the counter-load side bracket 14, a shaft 16 (rotating shaft) rotatably supported by the load-side bearing 13 and the counter-load side bearing 15, and an encoder 17 that detects a rotating position of the rotor 20, disposed on a counter-load side (the left side in FIG. 1) end part of the shaft 16.

The load-side bracket 12 and the counter-load side bracket 14 are connected to the frame 11 by bolts (not shown). On the load-side bracket 12, a dust seal 18 is disposed on the outside of the bearing 13 to prevent entry of foreign matter into the interior of the rotor 20. A connecting part 44 of a coil 41 of the stator 30 is disposed on a counter-load side end surface of a stator core 32 of the stator 30. An external power source is connected to the connecting part 44 via a lead wire (not shown), and power is supplied from the external power source to the coil 41 via the connecting part 44.

The rotor 20 has a substantially annular rotor core 22 having an axial-direction hole 21 that fits the shaft 16, and an axial-direction permanent magnet 23 embedded in the rotor core 22 in a V-shape per pole. With this arrangement, the rotor 20 is structured as a field system part with an embedded magnet type structure of multiple poles (8 in this example). A load-side lateral plate 8 and a counter-load side lateral plate 9 that respectively hold and prevent the load-side end surface and counter-load side end surface of the rotor 20 from moving outward in the load-side direction and outward in the counter-load side direction of the rotor 20 are attached to the shaft 16. A positioning lateral plate 7 of the rotor 20 is attached between the load-side lateral plate 8 and the above described load-side bearing 13 of the shaft 16.

Structure of Stator

The stator 30 has the substantially annular above described stator core 32 having multiple slots 31 (48 slots in this example), and the coils 41 (48 coils in this example) respectively housed in the above described slots 31. With this arrangement, the stator 30 is structured as an armature part. The stator core 32 is structured by arranging divided core elements 33 (48 core elements in this example) with a substantially fan-shaped transverse cross-section across the entire circumference, along the inner circumferential surface of the frame 11. Each of the divided core elements 33 has a tooth 34 with a rectangular transverse cross-sectional shape, on the radial-direction inside. At this time, the slot 31 is formed between the teeth (34, 34) respectively included in adjacent divided core elements (33, 33). With this arrangement, the slots 31 are disposed across the entire circumferential-direction circumference so as to extend along the inner circumferential surface of the above described frame 11. The slots 31 correspond to the teeth 34 with rectangular transverse cross-sectional shapes, and are each formed so as to be fan-shaped with the transverse cross-sectional shape narrowing toward the radial-direction inside.

Figure 3:
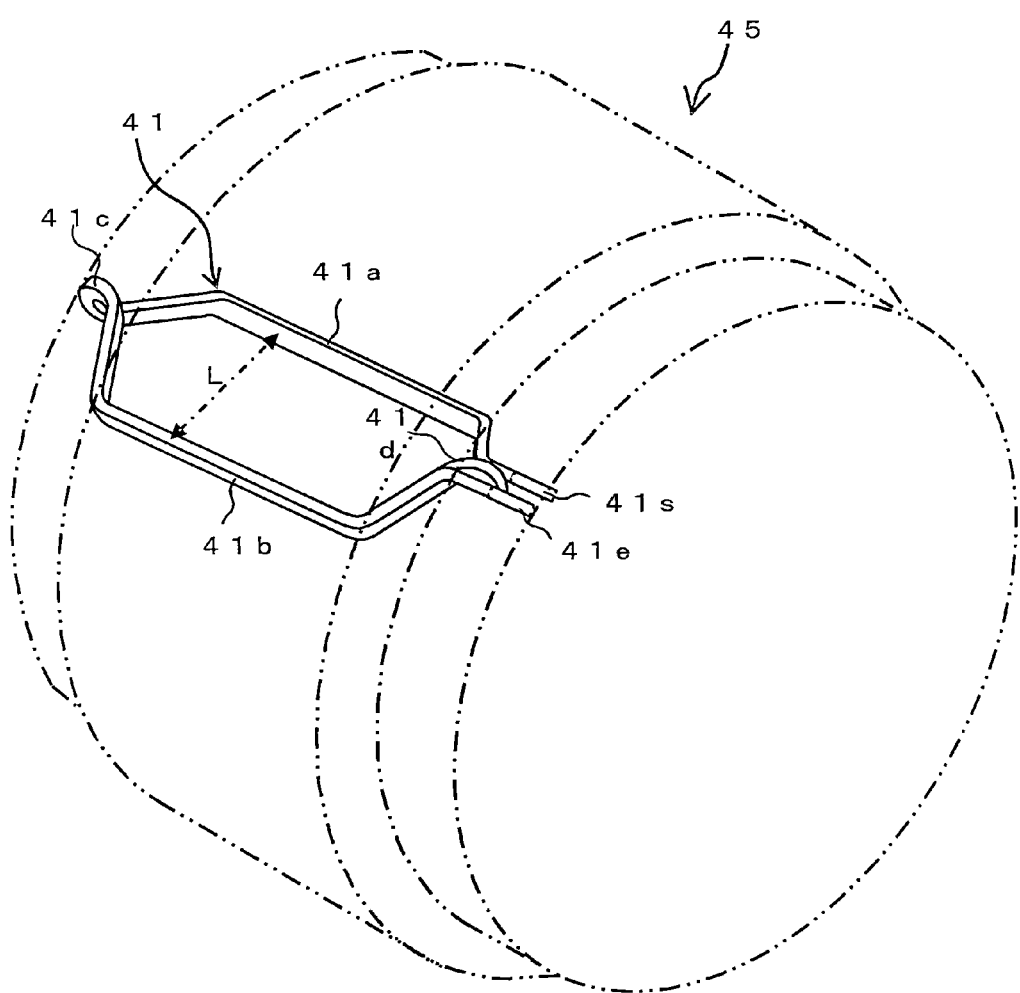
FIG. 3 is a conceptual view showing the outer appearance of the coil resin structure.

At this time, the above described coils 41 (48 coils in this example) is formed in advance as one substantially cylindrical coil resin structure 45, as shown in FIG. 3. The following describes the coil resin structure 45 formed by the 48 coils 41, and the detailed structures of and the respective coils 41, using FIG. 4 and FIG. 5.

Structure of Coil

Each of the coils 41 is formed as a hexagonal air-core coil, as shown in FIG. 4. That is, first a conductor 42 covered by a suitable insulating film (not shown) is wound multiple times (4 times, for example) into a long rectangular frame shape. Note that a flat rectangular wire with a rectangular transverse cross-sectional shape is used as the conductor 42 in this example. Nevertheless, the present disclosure is not limited thereto, allowing use of a lead wire with another shape (a round lead wire with a substantially circular transverse cross-sectional shape, for example). At this time, the conductor 42 is wound while layered from the lowermost layer in the direction of the upper layers on one of the long sides of the rectangular frame that face each other, and while layered from the uppermost layer in the direction of the lower layers on the other of the long sides. Further, at that time, the conductor 42 is wound while inverting the front and back so as to create a loop within a plane surface orthogonal to the plane surface of the above described rectangular frame, in the centre area of the two short sides that face each other. After the above described winding, the wound body of the conductor 42 is widened in the width direction and longitudinal direction as indicated by arrows (a1, a2, a3, a4) in FIG. 4, plastically deforming into a hexagonal shape, thereby achieving the above described coil 41, which is a hexagonal air-core coil.

That is, the coil 41 has a substantially linear first linear part (41a) (one side portion in a circumferential direction) positioned on the upper right side in FIG. 4 that leads to a winding start end 41s of the conductor 42, a substantially linear second linear part (41b) (other side portion in a circumferential direction) positioned on the lower left side in FIG. 4 that leads to a winding finish end (41e) of the conductor 42, inclined parts (41f, 41g) that respectively connect one end of the first linear part (41a) and the second linear part (41b) (upper left side in FIG. 4), one turn part (41c) disposed in the middle area of these inclined parts (41f, 41g), and another turn part (41d) (hereinafter "nose part") that continues to the inclined parts that connect the other end of the first linear part (41a) and the second linear part (41b).

Four-Layer Layered Structure of Conductor

In each of the above described parts (41a-41g) of the coil 41, the conductor 42 is wound multiple times (4 times in this example). As a result, in each of the above described parts (41a-41g), the conductor 42 is layered in multiple layers (4 layers in this example; hereinafter the same) in the radial direction (up-down direction in FIG. 4) of the stator core 32. Then, the first linear part (41a) and the second linear part (41b) of the coil 41 are disposed away from each other so as to substantially extend along the direction that is the circumferential direction of the stator core 32 when the stator core 32 is mounted to the slots 31 (in other words, when the coil resin structure 45 is mounted to the stator core 32).

Hence, during the above described mounting, the first linear part (41a) (or the second linear part (41b)) of a certain coil 41 included in the coil resin structure 45 is disposed well on the radial-direction inside (indicated by the "inner circumferential step" in FIG. 4) of each of the slots 31, and the first linear part (41a) (or the second linear part (41b)) of another coil included in the coil resin structure 45 is disposed well on the radial-direction outside (indicated by the "outer circumferential step" in FIG. 4) of each of the slots 31, as shown in the enlarged explanatory views inside the circles in FIG. 4. That is, with the coil resin structure 45 assembled to the stator core 32, in each of the 48 coils 41, the first linear part 41 is disposed well on the radial-direction inside (on the "inner to circumferential step" in FIG. 4) of a certain slot 31 while the second linear parts (41b) is disposed well on the radial-direction outside (on the "outer circumferential step" in FIG. 4) of another slot 31, four slots away in the circumferential direction. To achieve such a disposition, a separation distance (L) between the first linear part (41a) and the second linear part (41b) of the respective coils 41 described above (refer to FIG. 3) is substantially equal to a separation distance (X) equivalent to four slots 31 in the substantially circumferential direction (with the difference in the inner/outer radial-direction positions described above taken into account; refer to FIG. 2) when the aforementioned coil resin structure 45 is mounted to the stator core 32.

Pressure Molding

Further, as described above, the slot 31 is fan-shaped, with a transverse cross-sectional shape narrowing toward the radial-direction inside. Correspondingly, at least the first linear part (41a) and the second linear part (41b) of each of the coils 41 are pressure-molded in advance so that the outer shape agrees with the transverse cross-sectional shape of each of the slots 31 prior to being molded as described later. That is, the second linear part (41b) disposed well on the radial-direction outside of the slot 31 is molded into a flatter shape than the first linear part (41a) disposed well on the radial-direction inside of the slot 31. Specifically, in the four layer conductor 42 (conductors (42-1, 42-2, 42-3, 42-4) from the radial-direction inside toward the outside) having the first linear part (41a), the conductor (42-1) has the smallest circumferential-direction (the left-right direction in the enlarged view in FIG. 4) dimension and the largest radial-direction (the up-down direction in the enlarged view in FIG. 4) dimension. Then, the cross-sectional shape becomes increasingly flat for conductors further on the radial-direction outside, in the order of the conductor (42-2), the conductor (42-3), and the conductor (42-4), with the conductor (42-4) having the largest circumferential-direction dimension and the smallest radial-direction dimension. Similarly, in the four layer conductor 42 (conductors (42-5, 42-6, 42-7, 42-8) from the radial-direction inside toward the outside) having the second linear part (41b), the conductor (42-5) has the smallest circumferential-direction dimension and the largest radial-direction dimension. Then, the cross-sectional shape becomes increasingly flat for conductors further on the radial-direction outside, in the order of the conductor (42-6), the conductor (42-7), and the conductor (42-8), with the conductor (42-8) having the largest circumferential-direction dimension and the smallest radial-direction dimension. Note that the conductor (42-5) has a larger circumferential-direction dimension and a smaller radial-direction dimension than the conductor (42-4).

Forming Coil Resin Structure

Then, as conceptually shown in FIG. 5, an air gap 43 where the above described tooth 34 of the stator core 32 is fitted is formed between two coils 41 during the above described mounting, and each of the 48 coils 41 is shifted in position and overlapped while extended along the circumferential direction of the stator core 32 during the above described mounting. This overlapping mode is repeated so as to extend across the entire circumferential direction of the stator core 32 during the above described mounting (equivalent to the lap-winding step). Then, the 48 coils 41 thus lap-wound across the entire circumferential-direction circumference are integrally resin-molded and hardened by mold resin (not shown), thereby forming one substantially cylindrical coil resin structure 45 made of the 48 coils 41 (equivalent to the resin molding step), as shown in the above described FIG. 3.

Attaching Coil Resin Structure to Stator Core

Subsequently, the teeth 34 of the divided core element 33 are fitted (across the entire circumference of the coil resin structure 45) from the outer circumference side of the coil resin structure 45 into each of the air gaps 43 between adjacent coils (41, 41) of the coil resin structure 45 formed as described above. With this arrangement, the annular stator core 32 is constructed by the divided core elements 33 (48 elements in this example). Further, the coil resin structure 45 and the above described stator core 32 are integrally assembled while the first linear part (41a) of the coil 41 of the coil resin structure 45 is housed in the above described inner circumferential step of each of the slots 31 formed between the teeth (34, 34) of two adjacent divided core elements (33, 33), and the second linear part (41b) of the another coil 41 of the coil resin structure 45 is housed in the above described outer circumferential step of each of the slots 31 (equivalent to the assembly step). In this manner, the stator 30 is assembled.

As described above, according to the rotating electrical machine 10 in embodiment 1, each of the coils 41 has an air-core coil, and the first linear part (41a) and the second linear part (41b) are disposed in a so-called lap-winding mode in which the circumferential-direction position is sequentially shifted while the parts are separately inserted into different slots 31. At this time, the coils 41, which are air-core coils subjected to lap-winding and arranged around the entire circumferential-direction circumference as described above, are integrally resin-molded in advance while not inserted into the slots 31 to form one coil resin structure 45. On the other hand, the stator core 32 is structured by arranging the divided core element 33 in multiple across the entire circumferential-direction circumference. Each of the core elements 33 has the tooth 34, and the above described slot 31 is formed between two divided core elements 33 that are adjacent when arranged in multiple. Then, the divided core elements 33 are assembled from the outer circumference side of the coil resin structure 45 while each of the coils 41 included in the coil resin structure 45 is inserted into two corresponding slots 31. With this arrangement, the stator 30 with the lap-wound coils 41 inserted into the slots 31 of the stator core 32 is manufactured.

As described above, according to this embodiment, before being individually inserted into the slots 31, the coils 41 are constructed as one coil resin structure 45 and the stator core 32 with the divided structure is inserted into the one coil resin structure 45. With this arrangement, the coils are not inserted into the slots and molded by mold resin on the main line of the manufacturing process, but rather the coils 41 can be prepared as one resin structure 45 in advance on a sub-line of the manufacturing process. By constructing the coil resin structure 45 at a high space factor by the coils 41 on a sub-line that is a separate line from the main line, it is possible to decrease the generation of heat of the coil 41 itself, thereby improving the cooling performance of the rotating electrical machine 10.

Further, since the work is performed for assembling each of the coils 41 of the coil resin structure 45 constructed in advance on the sub-line while housing them into the slots 31, the mold resin molding work is no longer necessary on the main line, making it possible to significantly reduce the manufacturing time.

Then, the stator 30 is structured by the assembly body of the stator core 32 with a divided structure such as described above and one coil resin structure 45, thereby making it possible to perform disassembly easily when the rotating electrical machine 10 is no longer needed and is to be discarded. In particular, the iron material used on the core 32 side and the copper material used in the conductor 42 of the coil 41 can be easily separated, for example, making it possible to rapidly improve recyclability.

Further, in particular, according to this embodiment, each of the coils 41 is pressure-molded, thereby making the external shape thereof agree with the transverse cross-sectional shape of the corresponding slot 31. With this arrangement, there is also the advantage of more reliably improving the space factor, which is the actual disposition capacity of the coil 41 that occupies the slot 31, which is the disposition space of the coil 41. Further, there is also the advantage of improving the cooling performance by the decrease in coil heat generation resulting from the increase in the space factor of the rotating electrical machine 10.

Embodiment 2

Overview of Rotating Electrical Machine

Figure 6:
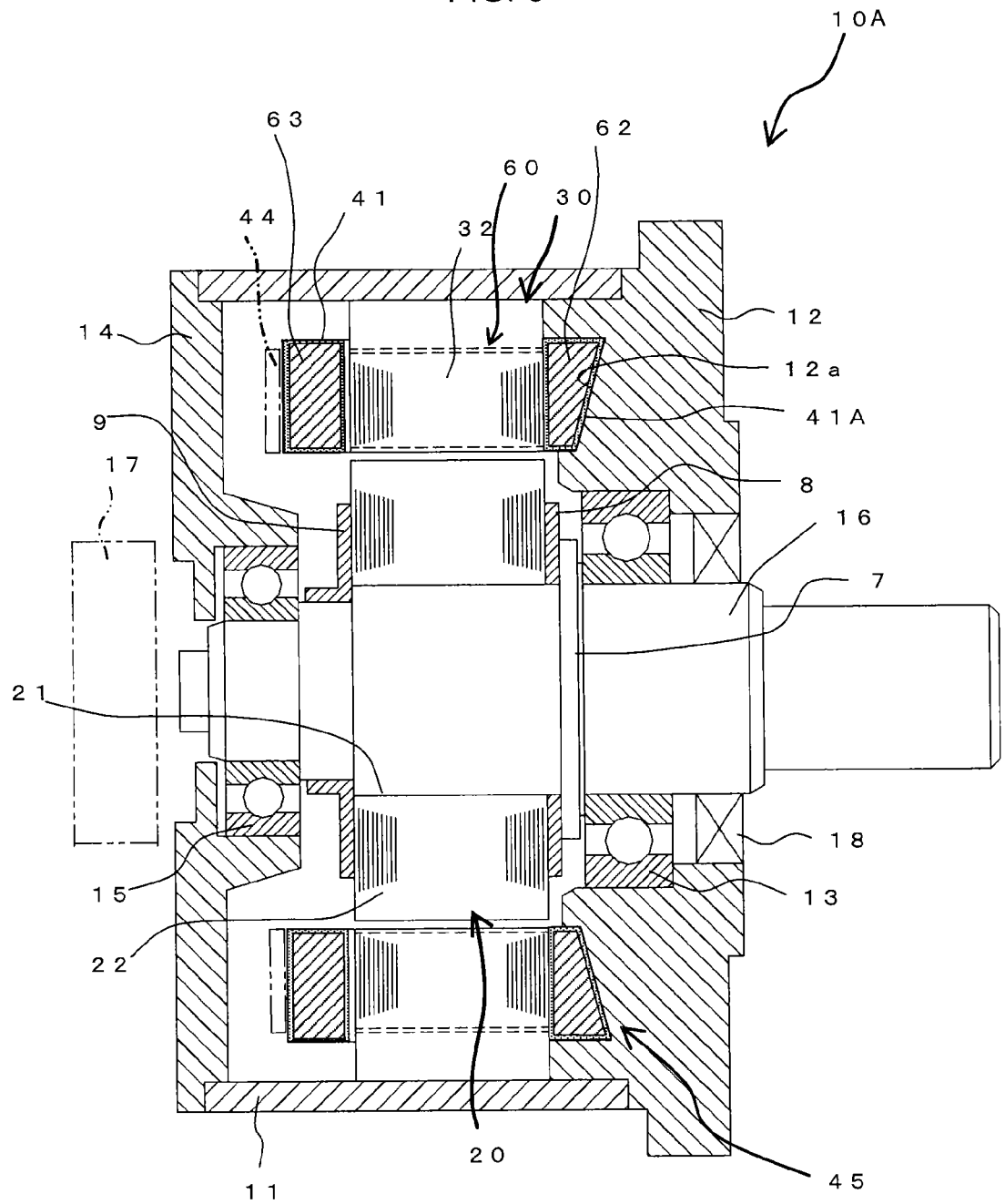
FIG. 6 is a longitudinal cross-sectional view showing the overall structure of a rotating electrical machine according to embodiment 2.

Next, the rotating electrical machine in embodiment 2 will be described using FIG. 6 to FIG. 12. The components that are the same as those in embodiment 1 will be denoted using the same reference numerals, and descriptions thereof will be suitably omitted or simplified. As shown in FIG. 6, a rotating electrical machine 10A in this embodiment has a coil resin structure 60 in the stator 30.

Figure 7:
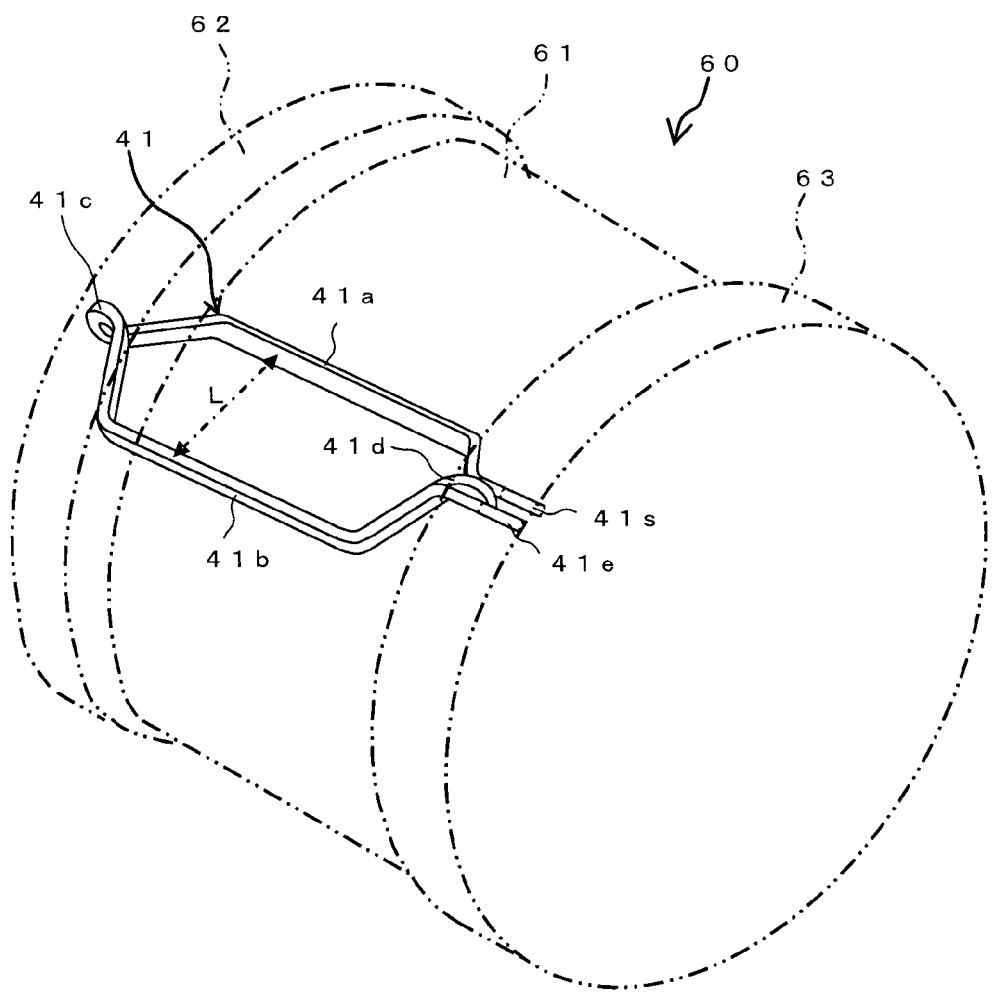
FIG. 7 is a conceptual view showing the outer appearance of the coil resin structure.

The coil resin structure 60, as schematically shown in FIG. 7, is formed by lap-winding the coils 41 (48 coils in this example, the same as described above; refer to FIG. 8 described later), which are the same air-core coils as the above described embodiment 1, across the entire circumferential-direction circumference of the stator core 32 (refer to the aforementioned FIG. 4 and FIG. 5 as well), and integrally resin-molding by mold resin and hardening the lap-wound coils 41. Each of the coils 41 is pressure-molded so that the external shape agrees with the transverse cross-sectional shape of the corresponding two slots 31. A load-side end surface (41A) of the coil 41 is formed so as to have a partial conical surface corresponding to an inside surface (12a) by the above described pressure-molding so as to be closely fitted to the inside surface (12a) of the load-side bracket 12.

Overview of Coil Resin Structure

Figure 8:
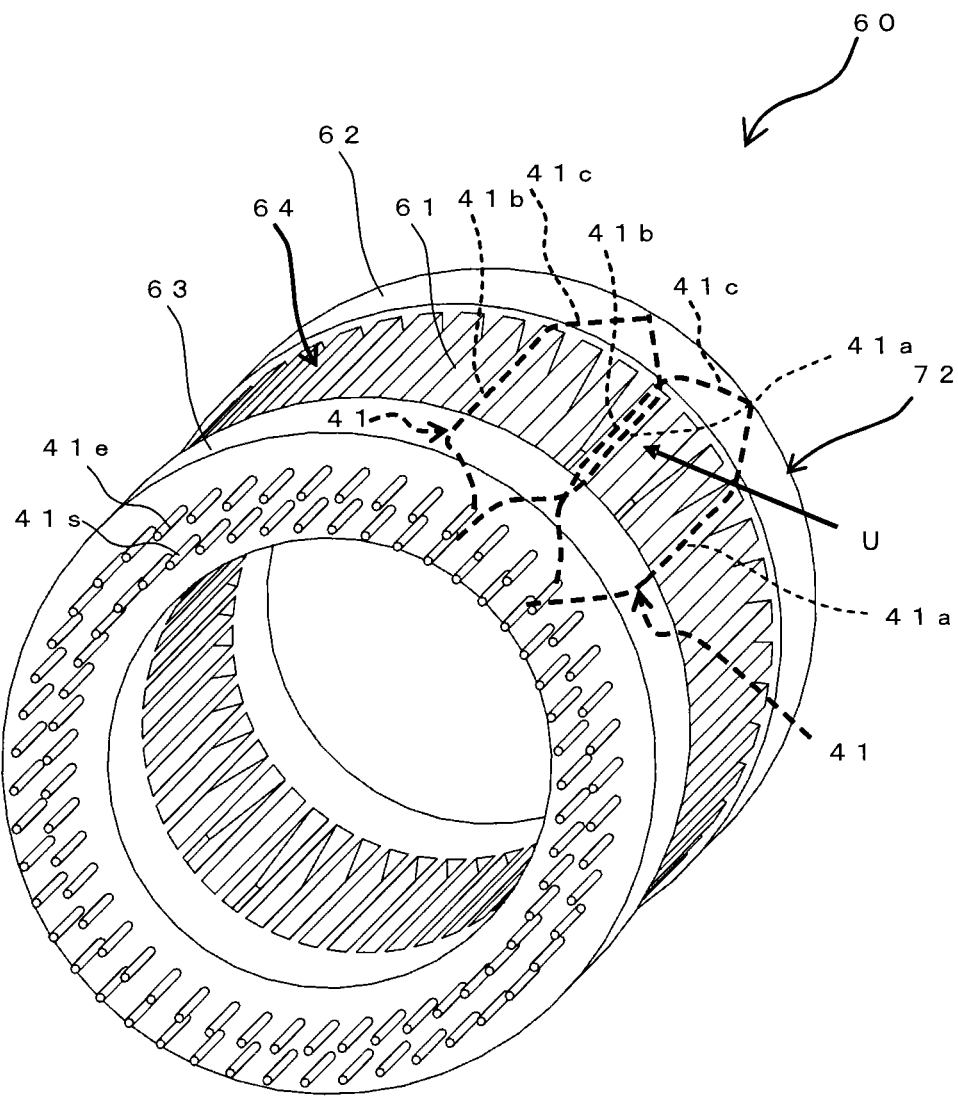
FIG. 8 is a perspective view showing the overall outer appearance of the coil resin structure.

FIG. 8 shows the overall outer appearance of the coil resin structure 60. The coil resin structure 60, as shown in FIG. 8, has a short, cylindrical load-side coil end part 62 positioned on the load side (equivalent to one axial-direction side of the rotor), a short, cylindrical counter-load side coil end part 63 positioned on the counter-load side (equivalent to the other axial-direction side of the rotor), and a middle part 64 positioned between the load-side coil end part 62 and the counter-load side coil end part 63. At this time, the coil resin structure 60, as shown in FIG. 7 and FIG. 8, has a nearly cylindrical reel shape overall, with the outer diameter of the middle part 64 smaller than the outer diameter of the above described coil end parts (62, 63) on both sides.

The load-side coil end part 62, as indicated by the dashed lines in FIG. 8, is an area where the portion of the turn part (41c) and the like on the above described one end side of each of the coils 41 is covered and contained (details described later). The counter-load side coil end part 63, as indicated by the dashed lines in FIG. 8, is an area where the above described winding start end (41s), the above described winding finish end (41e), the above described nose part (41d), and the like on the above described other end side of each of the coils 41 are covered (details described later).

In the middle part 64, multiple slot insertion parts 61 with a substantially rectangular plate shape, housed in the slots 31 of the stator core 32, are arranged in the circumferential direction. Note that, as described later, this slot insertion part 61 is an area where the above described first linear part (41a) and the above described second linear part (41b) of each of the coils 41 are covered and contained.

Molding by Primary Covering and Secondary Covering

This coil resin structure 60 is formed by performing resin-molding by mold resin twice on the front surface of each of the coils 41 disposed in advance in a substantially annular shape. That is, a primary covering layer 700 that covers the outside of each of the coils 41 (refer to FIG. 9 and the like described later) is generated by a first resin molding, thereby forming a primary molding 50. Subsequently, a secondary covering layer 800 that covers the outside of the primary covering layer 700 (refer to FIG. 12, described later) is generated by a second resin molding, thereby forming the above described coil resin structure 60. The following describes the details of the formation of the above described primary covering layer 700 and secondary covering layer 800, in order. The primary covering layer 700 links to means for covering an outside of the air-core coil. The secondary covering layer 800 links to means for covering an outside of the means for covering an outside of the air-core coil.

Formation of Primary Molding

Figure 9:
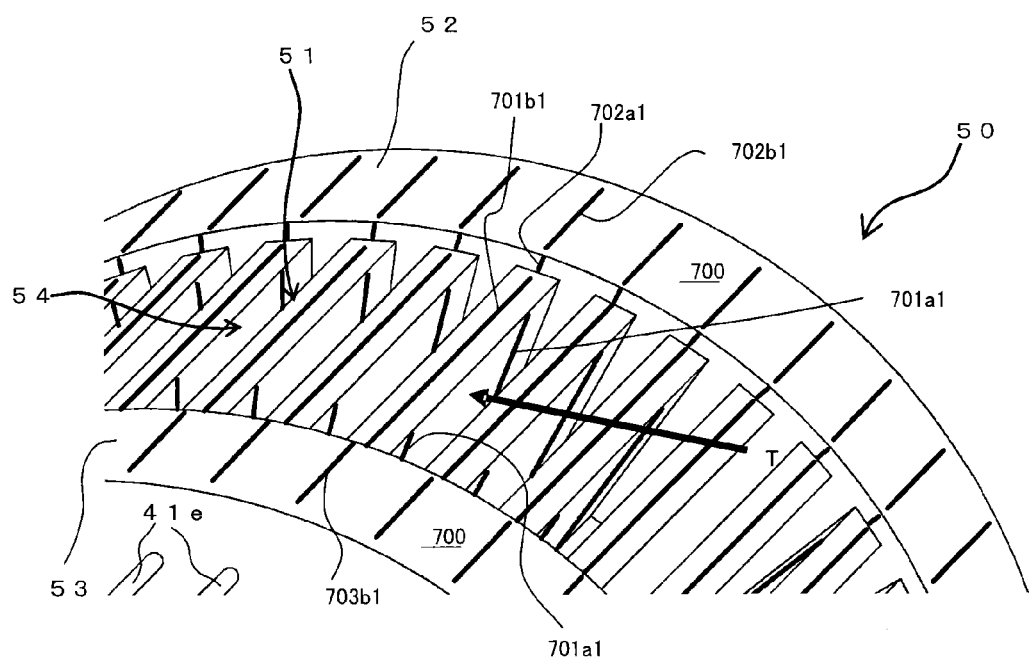
FIG. 9 is a perspective view showing a portion of the outer appearance of the primary molding.

The following describes the above described primary molding 50 using FIG. 9, FIG. 10, and FIG. 11. The primary molding 50, as described above, is structured by covering the outside of each of the coils 41 disposed in a substantially annular shape with the primary covering layer 700 (refer to FIG. 11 and FIG. 10). That is, the primary molding 50, as shown in FIG. 9, has a load-side coil end part 52 corresponding to the load-side coil end part 62 of the above described coil resin structure 60, a counter-load side coil end part 53 corresponding to the counter-load side coil end part 63 of the above described coil resin structure 60, and a middle part 54 corresponding to the middle part 64 of the above described coil resin structure 60, positioned between the load-side coil end part 52 and the counter-load side coil end part 53.

When the above described primary molding 50 is molded, the coils 41 disposed in the above described substantially annular shape is set in the primary mold, which is a split mold, and mold resin is poured into the interior of the mold, thereby forming the above described primary covering layer 700 by mold resin on the outside of each of the coils 41 (equivalent to the primary covering step). With this arrangement, regardless of the position and posture of each of the coils 41 inside the interior space of the above described primary mold, it is possible to achieve the above described primary molding 50 having the load-side coil end part 52 and the counter-load side coil end part 53 with a specified outer diameter dimensions determined in advance, and further having the identically shaped slot insertion parts 51 with a specified outer diameter dimension determined in advance in the middle of the coil ends parts (52, 53).

Middle Part

In the middle part 54, multiple slot insertion parts 51 with a substantially rectangular plate shape, respectively corresponding to the slots insertion parts 61 of the above described coil resin structure 60, are arranged in the circumferential direction. As shown in FIG. 10A, the second linear part (41b) of a certain coil 41 and the first linear part (41a) of another coil 41 are overlapped and layered in the radial direction in the slot insertion part 51. That is, in this example, the above described second linear part (41b) is disposed on the radial-direction outside (the upper side in FIG. 10A, FIG. 10C) of the slot insertion part 51, and the above described first linear part (41a) is disposed on the radial-direction inside (the lower side in FIG. 10A, FIG. 10C) of the slot insertion part 51 (refer to FIG. 4 and FIG. 8 as well). Then, by covering the outside of the layered first linear part (41a) and the second linear part (41b) with the primary covering layer 700, the slot insertion part 51 has a substantially rectangular plate shape with multiple protrusion portions (described later).

Specifically, the slot insertion part 51 has outer surface parts (701a, 701a) with a rectangular plane surface and the outer surface parts 701b, 701b with a long, narrow rectangular plane surface, as the outer surface resulting from the primary covering layer 700.

The outer surface part (701a) is respectively formed on both sides (the upper side and the lower side in FIG. 10B, the far side and the near side in FIG. 10A, and the left side and the right side in FIG. 10C) of the slot insertion part 51 along the circumferential direction. Each of the outer surface parts (701a) has at least one protrusion portion (701a1) (two portions in this example) resulting from the primary covering layer 700, protruded from the outer surface part (701a) in the above described circumferential direction in an amount equivalent to a predetermined dimension.

The outer surface part (701b) is respectively formed on both sides (the near side and the far side in FIG. 10B, the upper side and the lower side in FIG. 10A, and the upper side and the lower side in FIG. 10C) of the slot insertion part 51 along the radial direction. Each of the outer surface parts 701b has at least one protrusion portion (701b1) (one portion in this example) resulting from the primary covering layer 700, protruded from the outer surface part (701b) in the above described radial direction in an amount equivalent to a predetermined dimension.

Load-Side Coil End Part

The load-side coil end part 52 is formed into a substantially cylindrical shape having multiple protrusion portions (described later) by covering the outside of the turn part (41c) and the like on one axial-direction side of the coils 41 with the primary covering layer 700.

Specifically, the load-side coil end part 52 has an outer surface part (702a) with a substantially circular plate shape, an outer surface part (702b) with an annular curved surface, and an outer surface part (702c) with an annular curved surface, as the outer surface resulting from the primary covering layer 700.

Figure 10B:
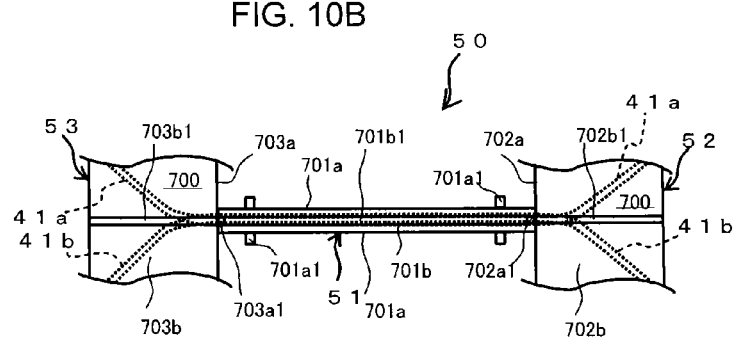
FIG. 10B is an arrow view from the arrow S direction in FIG. 10A.
Figure 10C:
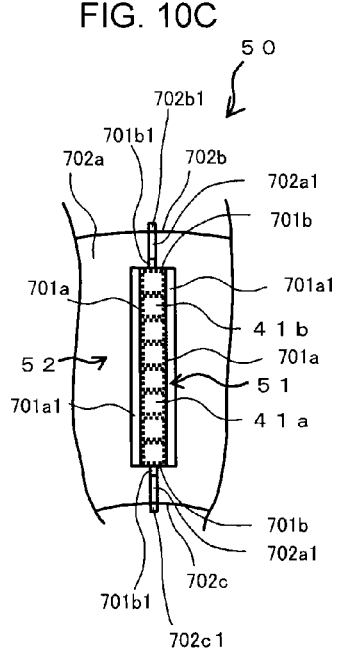
FIG. 10C is a transverse cross-sectional view of the R-R' cross-section in FIG. 10A.
Figure 10A:
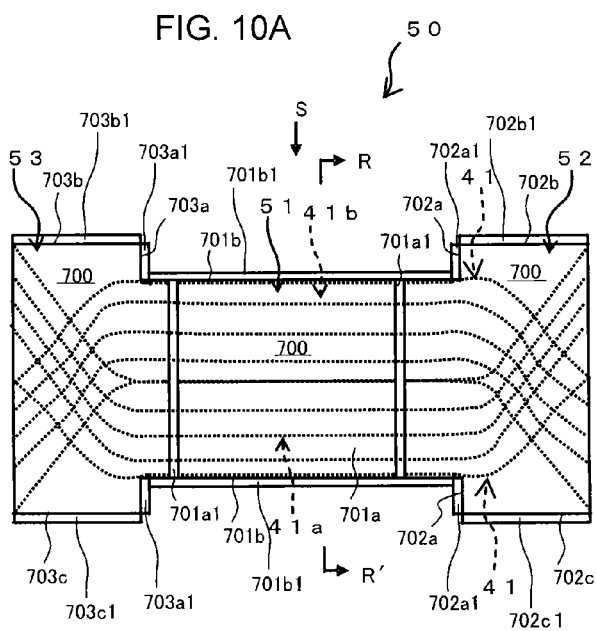
FIG. 10A is an arrow view from the arrow T direction in FIG. 9, showing the details of the main parts of the primary molding.

The outer surface part (702a) is formed on the aforementioned other axial-direction side (corresponding to the above described counter-load side; the left side in FIG. 10B and FIG. 10A, and the near side in FIG. 10C). The outer surface part 702a has at least one protrusion portion (702a1) (two portions in this example) resulting from the primary covering layer 700, protruded from the outer surface part (702a) in an amount equivalent to the same dimension as the above described protrusion portion (701a1).

The outer surface part (702b) is formed on the radial-direction outside (the near side in FIG. 10B, and the upper side in FIG. 10A and FIG. 10C). The outer surface part (702b) has at least one protrusion portion (702b1) (one portion in this example) resulting from the primary covering layer 700, protruded from the outer surface part (702b) in an amount equivalent to the same dimension as the above described protrusion portion (701b1).

The outer surface part (702c) is formed on the radial-direction inside (the far side in FIG. 10B, and the lower side in FIG. 10A and FIG. 10C). The outer surface part (702c) has at least one protrusion portion (702c1) (one in this example) resulting from the primary covering layer 700, protruded from the outer surface part (702c) in an amount equivalent to the same dimension as the above described protrusion portion (701b1).

Counter-Load Side Coil End Part

The counter-load side coil end part 53 is formed into a substantially cylindrical shape having multiple protrusion portions (described later) by covering the outside of the nose part (41d) and the like on the other axial-direction side of the coils 41 with the primary covering layer 700.

Specifically, the counter-load side coil end part 53 has an outer surface part (703a) with a substantially circular plate shape, an outer surface part (703b) with an annular curved surface, and an outer surface part (703c) with an annular curved surface, as the outer surface resulting from the primary covering layer 700.

The outer surface part (703a) is formed on the aforementioned one axial-direction side (corresponding to the above described load side; the right side in FIG. 10B and FIG. 10A). The outer surface part (703a) has at least one protrusion portion (703a1) (two portions in this example) resulting from the primary covering layer 700, protruded from the outer surface part (703a) in an amount equivalent to the same dimension as the above described protrusion portion (701a1) and the like.

The outer surface part (703b) is formed on the radial-direction outside (the near side in FIG. 10B, and the upper side in FIG. 10A). The outer surface part 703b has at least one protrusion portion (703b1) (one portion in this example) resulting from the primary covering layer 700, protruded from the outer surface part (703b) in an amount equivalent to the same dimension as the above described protrusion portion (701a1) and the like.

The outer surface part (703c) is formed on the radial-direction inside (the far side in FIG. 10B, and the lower side in FIG. 10A). The outer surface part (703c) has at least one protrusion portion (703c1) (one portion in this example) resulting from the primary covering layer 700, protruded from the outer surface part (703c) in an amount equivalent to the same dimension as the above described protrusion portion (701a1) and the like.

Molding Coil Resin Structure

The covering when the coil resin structure 60 is molded from the above described primary molding 50 will now be described using FIG. 12 and FIG. 8. After the primary molding 50 is molded as described above, the primary molding 50 is set in a secondary mold, which is a split mold, and the mold resin is poured into the interior of the mold to cover each of the outer surface parts (701a, 701b, 702a, 702b, 702c, 703a, 703b, 703c) of the primary covering layer 700 of the primary molding 50 with the secondary covering layer 800 at a specified thickness determined in advance, thereby forming the above described coil resin structure 60 (equivalent to the secondary covering step). At this time, the primary molding 50 is supported on the above described both radial-direction sides, the above described both circumferential-direction sides, and the above described both axial-direction sides with respect to the inner wall of the secondary mold via the aforementioned protrusion portions (701a, 701b1), the protrusion portions (702a1, 702b1, 702c1), the protrusion portions (703a1, 703b1, 703c1), in the interior of the above described secondary mold. As a result, with the above-described resin pouring, the secondary covering layer 800 having the same thickness as the height-direction dimension of each of the protrusion portions (701a, 701b1, 702a1, 702b1, 702c1, 703a1, 703b1, 703c1) (equivalent to the above described predetermined thickness) is formed on the entire outer front surface of the primary molding 50 (excluding the above described respective protrusion portions), thereby completing the above described coil structure 60. Note that the height-direction dimension of each of the protrusion portions (701a, 701b1, 702a1, 702b1, 702c1, 703a1, 703b1, 703c1) may be mutually the same or not the same.

The coil resin structure 60, as described above using FIG. 8, has the middle part 64, the load-side coil end part 62, and the counter-load side coil end part 63. At this time, in the middle part 64, the rectangular plate-shaped slot insertion part 61 where the outside of the primary covering layer 700 of the above described slot insertion part 51 of the primary molding 50 is covered by the secondary covering layer 800 is arranged in the circumferential direction. The load-side coil end part 62 is formed by covering the outside of the primary covering layer 700 of the above described load-side coil end part 52 of the primary molding 50 with the secondary covering layer 800. The counter-load side coil end part 63 is formed by covering the outside of the primary covering layer 700 of the above described counter-load side coil end part 53 of the primary molding 50 with the secondary covering layer 800.

Middle Part

As described above, in the middle part 64, the slot insertion parts 61 with the substantially rectangular plate shape are arranged in the circumferential direction. The slot insertion part 61 has rectangular outer surface parts (801a, 801a) and long, narrow rectangular outer surface parts (801b, 801b), as the outer surface resulting from the covered above described secondary covering layer 800 that further covers the outside of the above described primary covering layer 700.

The outer surface part (801a) is formed by further covering the outer front surface of the outer surface part (701a) resulting from the primary covering layer 700 of the above described primary molding 50 with the secondary covering layer 800 having a thickness equivalent to the height dimension of the protrusion portion (701a1) using the aforementioned technique, on both sides (the upper side and the lower side in FIG. 12B, the far side and the near side in FIG. 12A, and the left side and the right side in FIG. 12C) of the slot insertion part 61 along the circumferential direction.

The outer surface part (801b) is formed by further covering the outer front surface of the outer surface part (701b) resulting from the primary covering layer 700 of the above described primary molding 50 with the secondary covering layer 800 having a thickness equivalent to the height dimension of the protrusion portion (701b1) using the aforementioned technique, on both sides (the near side and the far side in FIG. 12A, the upper side and the lower side in FIG. 10A, and the upper side and the lower side in FIG. 10C) of the slot insertion part 61 along the radial direction.

Load-Side Coil End Part

The load-side coil end part 62 has an outer surface part (802a) with a substantially circular plate shape, an annular outer surface part (802b), and an outer surface part (802c) with an annular curved surface, as the outer surface resulting from the above described secondary covering layer 800 that further covers the outside of the above described primary covering layer 700.

The outer surface part (802a) is formed by further covering the outer front surface of the outer surface part (702a) resulting from the primary covering layer 700 of the above described primary molding 50 with the secondary covering layer 800 having a thickness equivalent to the height dimension of the protrusion portion (702a1) using the aforementioned technique, on the above described other axial-direction side (the left side in FIG. 12A and FIG. 12B, and the near side in FIG. 12C).

The outer surface part 802b is formed by further covering the outer front surface of the outer surface part (702b) resulting from the primary covering layer 700 of the above described primary molding 50 with the secondary covering layer 800 having a thickness equivalent to the height dimension of the protrusion portion (702b1) using the aforementioned technique, on the above described radial-direction outside (the near side in FIG. 12B, and the upper side in FIG. 12A and FIG. 12C).

The outer surface part (802c) is formed by further covering the outer front surface of the outer surface part (702c) resulting from the primary covering layer 700 of the above described primary molding 50 with the secondary covering layer 800 having a thickness equivalent to the height dimension of the protrusion portion (702c1) using the aforementioned technique, on the above described radial-direction inside (the far side in FIG. 12B, and the lower side in FIG. 12A and FIG. 12C).

Counter-Load Side Coil End Part

The counter-load side coil end part 63 has an outer surface part (803a) with a substantially circular plate shape, an outer surface part (803b) with an annular curved surface, and an outer surface part (803c) with an annular curved surface, as the outer surface resulting from the above described secondary covering layer 800 that further covers the outside of the above described primary covering layer 700.

The outer surface part (803a) is formed by further covering the outer front surface of the outer surface part (703a) resulting from the primary covering layer 700 of the above described primary molding 50 with the secondary covering layer 800 having a thickness equivalent to the height dimension of the protrusion portion (703a1) using the aforementioned technique, on the above described one axial-direction side (the right side in FIG. 12A and FIG. 12B).

The outer surface part (803b) is formed by further covering the outer front surface of the outer surface part (702b) resulting from the primary covering layer 700 of the above described primary molding 50 with the secondary covering layer 800 having a thickness equivalent to the height dimension of the protrusion portion (702b1) using the aforementioned technique, on the above described radial-direction outside (the near side in FIG. 12B, and the upper side in FIG. 12A and FIG. 12C).

The outer surface part (803c) is formed by further covering the outer front surface of the outer surface part (703c) resulting from the primary covering layer 700 of the above described primary molding 50 with the secondary covering layer 800 having a thickness equivalent to the height dimension of the protrusion portion (703c1) using the aforementioned technique, on the above described radial-direction inside (the far side in FIG. 12B, and the lower side in FIG. 12A and FIG. 12C).

The same advantages as those of the above described embodiment 1 are achieved according to this embodiment structured as described above as well. That is, by constructing the coil resin structure 45 at a high space factor by the coils 41 on a sub-line that is a separate line from the main line, it is possible to decrease the generation of heat of the coil 41 itself, thereby improving the cooling performance of the rotating electrical machine 10. Further, the mold resin molding work on the main line is no longer required, making it possible to significantly reduce the manufacturing time. Further, the rotating electrical machine 10 can be easily disassembled when it is no longer needed and is to be discarded. In particular, the iron material used on the stator core 35 side and the copper material used in the conductor 42 of the coil 41 can be easily separated, for example, making it possible to rapidly improve recyclability.

Further, according to this embodiment, the following advantages are achieved in addition to the above. That is, according to this embodiment, the coil resin structure 60 is manufactured by forming the primary covering layer 700 on the outside of the coil 41, which is an air-core coil, and then further forming the secondary covering layer 800 on the outside thereof. In the primary covering step, the coil 41 is housed into the above described primary mold, resin is poured into the interior of the mold, and the coil 41 is covered by the primary covering layer 700. At this time, the outer shape dimensions of the primary molding 50 that contains the coils 41 covered by the primary covering layer 700 (in other words, the shape dimensions of the space formed in the interior of the above described mold) are controlled. That is, in the interior of the primary molding 50, the skew and the position of each of the coils 41 do not matter.

Then, the above described primary molding 50 is further housed into a different secondary mold, resin is poured into the interior of the mold, and the primary molding 50 is covered by the secondary covering layer 800. As described above, the outer shape dimensions of the primary molding 50 are controlled by the above described primary mold with high precision (all outer shape dimensions of the primary molding 50 are the same, regardless of the position of the each of the coils 41 in the interior of the primary molding 50), thereby making it possible to form the secondary covering layer 800 on the outside of the above described primary molding 51 at a uniform thickness.

As described above, the secondary covering layer 800 is uniformly formed on the outside of the primary molding 50 wherein the outer shape dimensions are controlled by the primary covering layer 700 with high precision. With this arrangement, it is possible to maintain the minimum required thickness in the covering layer of the resin formed on the outer circumference side of the coil 41 (the primary covering layer 700+ the secondary covering layer 800).

Further, when the winding (the conductor 42) is wound during the manufacture of the coil 41, which is a preliminary stage of formation of the above described primary covering layer 700 (or when the coil 41 is subsequently pressure-molded), winding lift may occur, for example, causing the coil 41 to stick out from the outside of the primary mold or to become distorted in shape, and therefore the primary molding 50 to not always achieve the preferred external dimensions with high precision (hereinafter suitably referred to as "irregular shape"). According to this embodiment 2, even in such a case, the coil 41 with the above described irregular shape is housed in the interior of the primary mold and the primary mold is closed, making it possible to forcibly achieve the aforementioned high-precision outer shape dimensions of the primary molding 50. However, in this case, resin does not flow into areas of the coil 41 that are contacted and pressed by the above described primary mold, resulting in a thickness of the primary covering layer 700 of zero (or near that value). Nevertheless, as described above, the secondary covering layer 800 having a predetermined thickness is subsequently uniformly formed across the entire outside area of the primary covering layer 700, thereby making it possible to reliably form the resin covering layer in these areas as well.

As a result of the above, according to this embodiment, it is possible to suppress variance in thickness in the covering layer when the coil 41 is covered, improving the uniformity.

Further, in particular, according to this embodiment, in the primary covering layer 700, multiple protrusion portions (the protrusion portions (701a1, 701b1), the protrusion portions (702a1, 702b1, 702c1), and the protrusion portions (703a1, 703b1, 703c1) are protruded from each outer surface part in an amount equivalent to a predetermined dimension on the outer surface (the outer surface part (701a) and the outer surface part 701b) of the slot insertion part 51, on the outer surface (the outer surface part 702a, the outer surface part (702b), and the outer surface part 702c) of the load-side coil end part 52, and on the outer surface (the outer surface part 703a, the outer surface part (703b), and the outer surface part (703c)) of the counter-load side coil end part 53. Then, the secondary covering layer 800 is disposed so as to cover the outside of the above described primary covering layer 700 at a thickness equal to the above described predetermined dimensions (the height-direction dimension of each of the protrusion portions).

That is, in this embodiment, each of the outer surface parts of the primary molding 50 after the primary covering layer 700 is formed has the above described protrusion portions (701a1, 701b1, 702a1, 702b1, 702c1, 703a1, 703b1, 703c1) having a predetermined dimension (equivalent to the thickness dimension of the secondary covering layer 800). With this arrangement, when the primary molding 50 is housed in the secondary mold to form the secondary covering layer 800, it is possible to reliably support the entire primary molding 50 with respect to the inner wall of the secondary mold by the above described protrusion portions (701a1, 701b1, 702a1, 702b1, 702c1, 703a1, 703b1, 703c1), as described above.

Further, in particular, according to this embodiment, resin is poured and filled in the area around the primary molding 50 supported by the above described protrusion portions (701a1, 701b1, 702a1, 702b1, 702c1, 703a1, 703b1, 703c1), thereby causing the above described secondary covering layer 800 to cover the outside of the above described primary covering layer 700, excluding the above described protrusion portions, at a thickness equal to the above described predetermined dimension. With this arrangement, it is possible to reliably uniformly form the secondary covering layer 800 in the area around the primary molding 50 housed in the secondary mold other than the protrusion portions (701a1, 701b1, 702a1, 702b1, 702c1, 703a1, 703b1, 703c1).

Further, in particular, according to this embodiment, in the coil resin structure 60, the outer diameter of the middle part 64 having the slot insertion part 61 housed in the slots 31 is smaller than the outer diameter of the coil end parts (62, 63)

on both sides of the rotor 30 along the axial direction. This has the following significance.

That is, when the coils 41 are disposed on the stator core 32 as described above, the rotor 20 is disposed on the radial-direction inside of the portion of each of the coils 41 housed in the slot 31 (the middle part 64 other than the coil end parts (62, 63)), and a support structure of the housing of the rotating electrical machine (10A) is disposed on the radial-direction outside of the above described slot insertion part 61 of the above described middle part 64 of each of the coils 41, as shown in FIG. 6. Hence, according to this embodiment, in the coil resin structure 60, the outer diameter of the middle part 64 where other members and structures are disposed on the radial-direction inside and outside as described above is made smaller than the outer diameter of the coil end parts (62, 63) where there is no such disposition. With this arrangement, it is possible to prevent the overall rotating electrical machine (10A) from increasing in size in the radial direction, and thus decrease the size.

Embodiment 3

Figure 13:
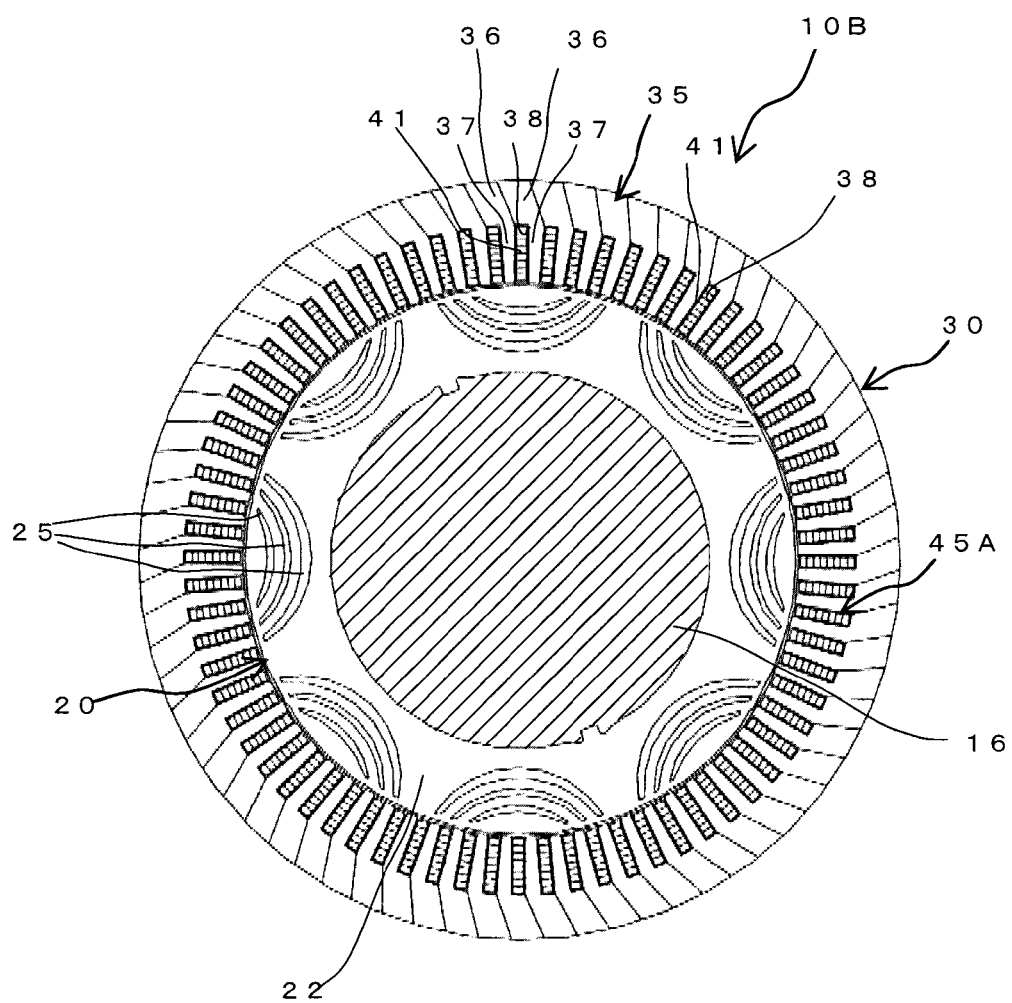
FIG. 13 is a transverse cross-sectional view showing the overall structure of a rotating electrical machine according to embodiment 3.

Next, the rotating electrical machine in embodiment 3 will be described using FIG. 13. As shown in FIG. 13, a rotating electrical machine (10B) in this embodiment is a reluctance motor having the rotor 20 inside the stator 30. The components that are the same as those in embodiment 1 will be denoted using the same reference numerals, and descriptions thereof will be suitably omitted or simplified.

In the rotating electrical machine (10B) shown in FIG. 13, the stator 30 has a stator core 35. In the stator core 35, similar to the above described embodiment 1, multiple divided core elements 36 (72 elements in this example) are arranged across the entire circumference while extending along the inner circumferential surface of the frame 11 of the stator 30 (refer to the above described FIG. 2). Each of the divided core elements 36 has a tooth 37 with a transverse cross-section having a tapered trapezoidal shape on the radial-direction inside. Then, a slot 38 with a rectangular (shaped like a long rectangular) transverse cross-section is formed between the above described teeth (37, 37) of adjacent divided core elements (36, 36).

According to this embodiment, similar to the above described embodiment 1, the coils 41 (72 coils in this example) are inserted (housed) in the above described slots 38 (72 slots in this example). At this time, similar to the above, each of the coils 41 is shifted in position and lap-wound so that the air gap 43 where the tooth 37 of the divided core element 36 is fit is formed between two coils (41, 41). Then, 72 lap-wound coils 41 are integrally resin-molded using mold resin (not shown), forming one substantially cylindrical coil resin structure 45 (not shown; refer to the above described FIG. 8 as well).

At this time, according to this embodiment, the transverse cross-sectional shape of the tooth 37 is tapered, and thus the transverse cross-sectional shape of the slot 38 is left rectangular (shaped like a long rectangle) as is. As a result, the pressure-molding with respect to the outer shape such as in the above described embodiment 1 is not performed on the first linear part (41*a*) and the second linear part (41*b*) of the coil 41.

In this embodiment as well, similar to the above described embodiment 1, the teeth 37 of the divided core element 36 are fitted (across the entire circumference of the coil resin structure 45) from the outer circumference side of the coil resin structure 45 into each of the air gaps 43 between adjacent coils (41, 41) of the coil resin structure 45. With this arrangement, the annular stator core 35 is constructed by the 72 divided core elements 36. Further, the coil resin structure 45 and the above described stator core 35 are assembled while the first linear part of the coil 41 of the coil resin structure 45 is housed in the above described inner circumferential step of each of the slots 38 formed between the teeth (37, 37) of two adjacent divided core elements (36, 36), and the second linear part of another coil 41 of the coil resin structure 45 is housed in the above described outer circumferential step of each of the slots 38. Note that while the above described first linear part in this embodiment is equivalent to the first linear part (41*a*) in the above described embodiment 1, each layer of the four layer conductor 42 has the same substantially rectangular transverse cross-sectional shape. Further, while the above described second linear part in this embodiment is equivalent to the second linear part (41*b*) in the above described embodiment 2, each layer of the four layer conductor 42 has the same substantially rectangular transverse cross-sectional shape. In this manner, the stator 30 is assembled.

Note that a total of 24 air gap parts 25 are disposed on the rotor core 22 of the rotor 20, three per each of multiple poles (8 poles in this example) along the circumferential direction. The air gap part 25 curves in a convex manner on the radial-direction inside. This air gap part 25 can cause a difference in the magnetic path resistance of the rotor core, resulting in a reluctance torque.

The same advantages as those of the above described embodiment 1 are achieved according to this embodiment structured as described above as well. That is, by constructing the coil resin structure 45 at a high space factor by the coils 41 on a sub-line that is a separate line from the main line, it is possible to decrease the generation of heat of the coil 41 itself, thereby improving the cooling performance of the rotating electrical machine (10B). Further, the mold resin molding work on the main line is no longer required, making it possible to significantly reduce the manufacturing time. Further, the rotating electrical machine (10B) can be easily disassembled when it is no longer needed and is to be discarded. In particular, the iron material used on the stator core 35 side and the copper material used in the conductor 42 of the coil 41 can be easily separated, for example, making it possible to rapidly improve recyclability.

Obviously, numerous modifications and variations of the present disclosure are possible in light of the above teachings. It is therefore to be understood that within the scope of the appended claims, the disclosure may be practiced otherwise than as specifically described herein.

What is claimed is:
1. A rotating electrical machine, comprising:
   a rotor; and
   a stator positioned circumferentially around the rotor and comprising
      a plurality of core elements arrayed in a circumferential direction of the rotor such that the plurality of core elements forms a plurality of slots arrayed in the circumferential direction, and
      a unitary cylindrical coil resin structure comprising molded resin and a plurality of lap wound air-core coils resin-molded in the molded resin, each of the air-core coils having an air-core, a first side portion and a second side portion extending on opposite sides of the air-core such that the first side portion extends through a first one of the plurality of slots and the second side portion extends through a second one of the plurality of slots, wherein the coil resin structure includes a primary layer of resin that covers an outside of the air-core coil, and a secondary layer of resin that covers an outside of the primary layer of resin, the primary layer of resin includes an outer surface that includes a plurality of protrusion portions that protrude a protrusion height from the outer surface, and the secondary layer of resin has a thickness equal to the protrusion height.

2. The rotating electrical machine according to claim 1, wherein the secondary layer of resin covers portions of the primary layer of resin that do not include the plurality of protrusion portions.

3. The rotating electrical machine according to claim 2, wherein the coil resin structure extends in an axial direction of the rotor from a first end to a second end, the coil resin structure including a first end portion at the first end, a second end portion at the second end, and a middle portion between the first end portion and the second end portion, the middle portion is positioned in the plurality of slots and the first and second end portions are not positioned in the plurality of slots, and an outer diameter of the middle a portion is smaller than an outer diameter of the first and second end portions of the coil resin structure.

4. The rotating electrical machine according to claim 2, wherein each of the core elements includes a tooth that extends radially inward towards the rotor.

5. The rotating electrical machine according to claim 4, wherein each of the slots is defined between teeth of adjacent core elements of the plurality of core elements.

6. The rotating electrical machine according to claim 2, wherein a position of each of the air-core coils in the circumferential direction is sequentially shifted in a lap-wind manner.

7. The rotating electrical machine according to claim 1, wherein the coil resin structure extends in an axial direction of the rotor from a first end to a second end, the coil resin structure including a first end portion at the first end, a second end portion at the second end, and a middle portion between the first end portion and the second end portion, the middle portion is positioned in the plurality of slots and the first and second end portions are not positioned in the plurality of slots, and an outer diameter of the middle a portion is smaller than an outer diameter of the first and second end portions of the coil resin structure.

8. The rotating electrical machine according to claim 7, wherein each of the core elements includes a tooth that extends radially inward towards the rotor.

9. The rotating electrical machine according to claim 1, wherein each of the core elements includes a tooth that extends radially inward towards the rotor.

10. The rotating electrical machine according to claim 9, wherein each of the slots is defined between teeth of adjacent core elements of the plurality of core elements.

11. The rotating electrical machine according to claim 1, wherein a position of each of the air-core coils in the circumferential direction is sequentially shifted in a lap-wind manner.

12. A unitary cylindrical coil resin structure for a rotating electrical machine, comprising:
molded resin; and
a plurality of lap wound air-core coils resin-molded in the molded resin, each of the air-core coils having an air-core, a first side portion and a second side portion extending on opposite sides of the air-core,
wherein when assembled with a plurality of core elements of a stator of the rotating electrical machine, the plurality of core elements are arrayed in a circumferential direction of a rotor such that the plurality of core elements forms a plurality of slots arrayed in the circumferential direction, the first side portion of each of the air-core coils extends through a first one of the plurality of slots, and the second side portion of each of the air-core coils extends through a second one of the plurality of slots, the molded resin includes a primary layer of resin that covers an outside of the air-core coil, and a secondary layer of resin that covers an outside of the primary layer of resin, the primary layer of resin includes an outer surface that includes a plurality of protrusion portions that protrude a protrusion height from the outer surface, and the secondary layer of resin has a thickness equal to the protrusion height.

13. The unitary cylindrical coil resin structure according to claim 12, wherein the secondary layer of resin covers portions of the primary layer of resin that do not include the plurality of protrusion portions.

14. The unitary cylindrical coil resin structure according to claim 13, wherein the coil resin structure extends in an axial direction of the rotor from a first end to a second end, the coil resin structure including a first end portion at the first end, a second end portion at the second end, and a middle portion between the first end portion and the second end portion, wherein the middle portion is positioned in the plurality of slots and the first and second end portions are not positioned in the plurality of slots, and wherein an outer diameter of the middle a portion is smaller than an outer diameter of the first and second end portions of the coil resin structure.

15. The unitary cylindrical coil resin structure according to claim 12, wherein the coil resin structure extends in an axial direction of the rotor from a first end to a second end, the coil resin structure including a first end portion at the first end, a second end portion at the second end, and a middle portion between the first end portion and the second end portion, wherein the middle portion is positioned in the plurality of slots and the first and second end portions are not positioned in the plurality of slots, and wherein an outer diameter of the middle a portion is smaller than an outer diameter of the first and second end portions of the coil resin structure.

16. A method for manufacturing a rotating electrical machine, comprising:
lap-winding a plurality of air-core coils such that a plurality of lap wound air-core coils forms a substantially cylindrical reel shape;
resin-molding the plurality of lap wound air-core coils such that a unitary cylindrical coil resin structure comprising molded resin and the plurality of lap wound air-core coils resin-molded in the molded resin is formed; and
assembling a plurality of core elements of a stator to the unitary cylindrical coil resin structure such that the plurality of core elements is arrayed in a circumferential direction of a rotor and forms a plurality of slots arrayed in the circumferential direction, each of the air-core coils having an air-core, a first side portion and a second side portion extending on opposite sides of the air-core such that the first side portion extends through a first one of the plurality of slots and the second side portion extends through a second one of the plurality of slots,
wherein the resin-molding of the lap wound air-core coils includes covering the plurality of lap wound primary resin layer, and covering the primary resin layer with a secondary resin layer, the covering of the lap wound air-core coils with the primary resin layer includes forming a plurality of protrusion portions that protrude a protrusion height from an outer surface of the primary resin layer, and the covering of the primary resin layer with the secondary resin layer includes forming the secondary layer of resin having a thickness equal to the protrusion height.

17. The method for manufacturing a rotating electrical machine according to claim 16, wherein the covering of the primary resin layer with the secondary resin layer includes covering portions of the primary layer of resin that do not include the plurality of protrusion portions.

18. The method for manufacturing a rotating electrical machine according to claim 16, wherein each of the core elements includes a tooth that extends radially inward towards the rotor, and the assembling of the unitary cylindrical coil resin structure includes positioning the core elements such that each of the slots is formed by teeth of adjacent core elements.

19. The method for manufacturing a rotating electrical machine according to claim 16, wherein the unitary cylindrical coil resin structure extends in an axial direction from a first end to a second end and includes a first end portion at the first end, a second end portion at the second end, and a middle portion between the first end portion and the second end portion, an outer diameter of the middle portion is smaller than an outer diameter of the first and second end portions of the coil resin structure, and the assembling of the unitary cylindrical coil resin structure includes positioning the middle portion in the plurality of slots of the stator and the first and second end portions on opposite sides of the plurality of slots of the stator.

20. The method for manufacturing a rotating electrical machine according to claim 16, further comprising positioning the stator circumferentially around the rotor.

\* \* \* \* \*